(12) United States Patent
Lambert et al.

(10) Patent No.: US 7,320,781 B2
(45) Date of Patent: Jan. 22, 2008

(54) METHOD FOR ADJUSTING A REDUCTANT USED IN AN INTERNAL COMBUSTION ENGINE TO REDUCE NOX

(76) Inventors: Christine Kay Lambert, 2310 W. Miller Cir., Westland, MI (US) 48186; Karen Marie Adams, 3235 Gensley Rd., Ann Arbor, MI (US) 48103; Robert Henry Hammerle, 32500 Susanne, Franklin, MI (US) 48025

( * ) Notice: Subject to any disclaimer, the term of this patent is extended or adjusted under 35 U.S.C. 154(b) by 268 days.

(21) Appl. No.: 10/186,690

(22) Filed: Jul. 1, 2002

(65) Prior Publication Data
US 2003/0005683 A1    Jan. 9, 2003

Related U.S. Application Data

(63) Continuation-in-part of application No. 09/592,202, filed on Jun. 13, 2000, now abandoned.

(51) Int. Cl.
*B01D 53/56* (2006.01)
(52) U.S. Cl. .................................................. 423/239.1
(58) Field of Classification Search ............. 423/213.2, 423/235, 237, 238, 239.1
See application file for complete search history.

(56) References Cited

U.S. PATENT DOCUMENTS

| | | | |
|---|---|---|---|
| 3,977,836 A | * | 8/1976 | Matsuda et al. ............. 436/113 |
| 4,681,746 A | | 7/1987 | Michalak et al. |
| 4,735,785 A | * | 4/1988 | Eichholtz et al. ........ 423/239.1 |
| 4,751,054 A | | 6/1988 | Watanabe |
| 4,778,665 A | * | 10/1988 | Krishnamurthy et al. 423/239.2 |
| 4,963,332 A | | 10/1990 | Brand et al. |
| 5,047,220 A | | 9/1991 | Polcer |
| 5,233,934 A | | 8/1993 | Krigmont et al. |
| 5,369,956 A | | 12/1994 | Daudel et al. |
| 5,540,047 A | | 7/1996 | Dahlheim et al. |
| 6,004,524 A | | 12/1999 | Morsbach et al. |
| 6,017,503 A | | 1/2000 | Kato et al. |
| 6,182,444 B1 | | 2/2001 | Fulton et al. |
| 6,269,633 B1 | | 8/2001 | Van Nieuwstadt et al. |
| 6,295,809 B1 | | 10/2001 | Hammerle et al. |
| 6,305,160 B1 | | 10/2001 | Hammerle et al. |

FOREIGN PATENT DOCUMENTS

EP          0263183          4/1988

* cited by examiner

*Primary Examiner*—Edward M. Johnson
(74) *Attorney, Agent, or Firm*—Diana D. Brehob

(57) ABSTRACT

A method for controlling reductant injection into an exhaust stream upstream of a catalyst coupled to an internal combustion engine is disclosed. In the method, an ammonia sensor located downstream of the exhaust catalyst is used to determine ammonia concentration in the exhaust stream. The ammonia concentration is compared to an allowable threshold and an allowable fraction, i.e., a maximum limit on a fraction of ammonia in the exhaust stream compared with the ammonia supplied by the reductant injector. Additionally, based on a NOx sensor, it is determined whether NOx conversion of the catalyst has increased in response to an increase in reductant injection. If not, reductant injection quantity is reduced.

18 Claims, 2 Drawing Sheets

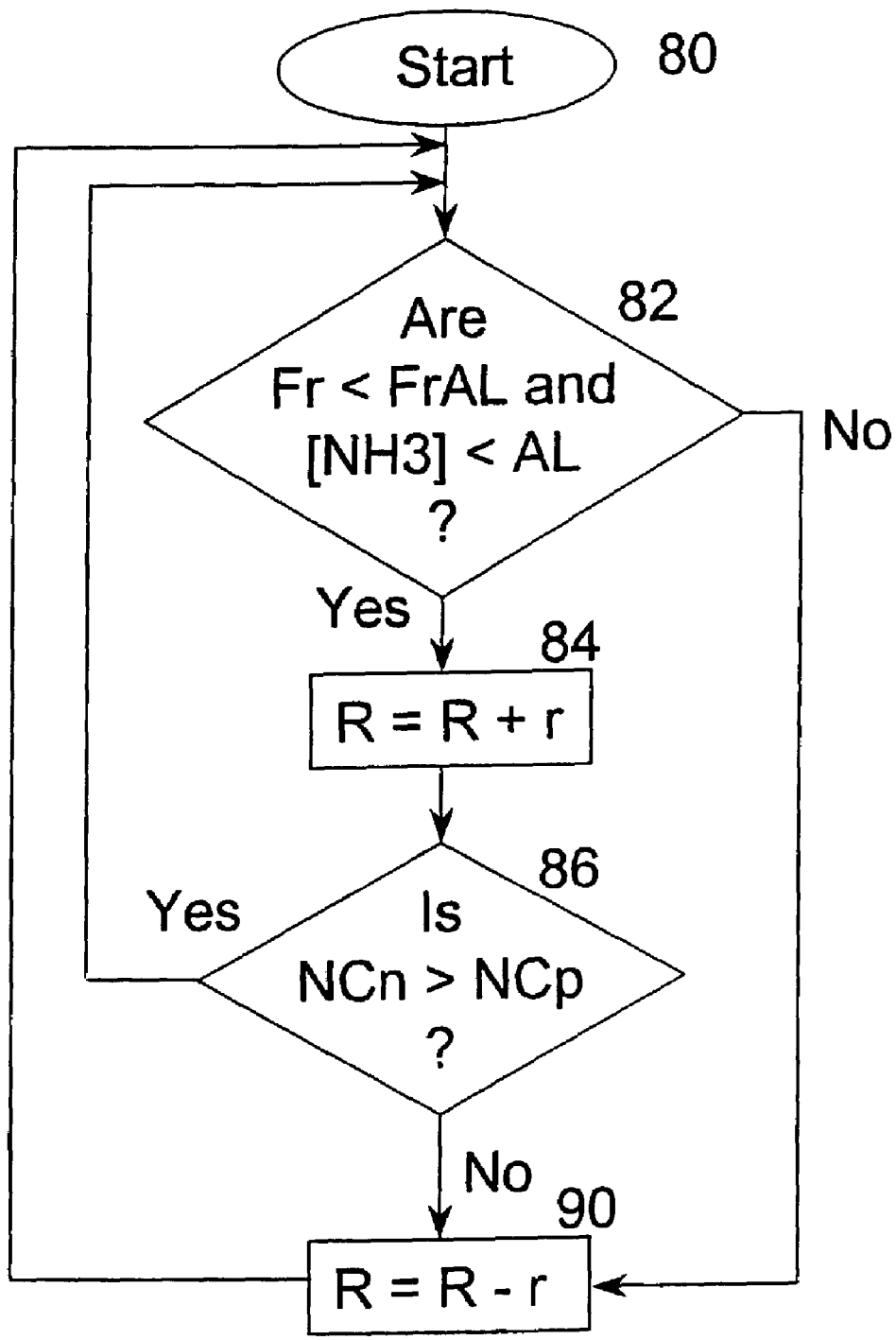

METHOD FOR ADJUSTING A REDUCTANT USED IN AN INTERNAL COMBUSTION ENGINE TO REDUCE NOX

CROSS-REFERENCE TO RELATED CASES

This is a continuation-in-part of patent application, Ser. No. 09/592,202, filed Jun. 13, 2000 now abandoned assigned to the same assignee as the present invention, the entire subject matter thereof being incorporated herein by reference.

TECHNICAL FIELD

The invention relates to internal combustion engines and more particularly to methods and systems for controlling reductant injection into a selective reduction catalyst used in such engine to reduce NOx produced by such engine.

BACKGROUND AND SUMMARY OF THE INVENTION

As is known in the art, to reduce exhaust emissions, particularly, NOx emissions, internal combustion engines, particularly diesel engines, use selective catalytic reduction systems. In such reduction systems, a reductant, typically ammonia (NH3), is used as the reducing agent. More particularly, in such a system, regulated emissions, such as nitrogen oxides, NOx, can be reduced in an oxygen-rich environment to nitrogen and water over a catalyst when a reducing agent, such as ammonia, is added. While it is desirable to consume all of the added reductant in the process of reducing the NOx, an un-consumed portion of the reductant; i.e., slip, is produced. This slip is in effect a waste of the reductant.

One method suggested for regulating reductant slip is to use a reductant sensor; i.e., an ammonia sensor when ammonia is used as the reductant. In such case, the ammonia sensor is located downstream of the catalyst. The detected ammonia concentration is compare with a fixed upper threshold value. This comparison generates a correction signal that is used to control the metering of ammonia upstream of the catalyst. Allegedly, by regulating actual ammonia slip to the upper threshold value, a certain NOx reduction is obtained. Such a system is disclosed in U.S. Pat. No. 5,369,956.

Another method for regulating NOx emissions and reductant slip is to use an after-catalyst NOx sensor to detect NOx concentration. Control of NOx emission is achieved by varying reductant injection until the level or quantity of NOx, as measured by the sensor, falls within an acceptable limit. The amount of reductant injected to keep NOx emissions within the acceptable limit needs to be balanced with an ammonia slip limit. This can be measured and controlled by an after-catalyst ammonia sensor. Such a system is disclosed in U.S. Pat. No. 5,233,934.

Alternatively, ammonia slip can be calculated and controlled using an algorithm. Such a system is disclosed in U.S. Pat. No. 4,751,054.

Applicants have recognized that, in general, as maximum NOx conversion is approached with increasing the reductant, e.g., ammonia addition, i.e., increasing NH3/NOx molar ratio, ammonia starts to slip. After maximum NOx conversion is attained, ammonia slip increases more rapidly with increasing NH3/NOx. For example, if ammonia slip is regulated to a constant concentration value, as by sensing the amount of ammonia downstream of the catalyst, an ammonia setting high enough for sufficient NOx conversion at high NOx feed gas levels is likely excessive for low NOx feed gas levels (i.e., at low torque demands), thereby wasting ammonia.

Conversely, a setting at minimum detectable ammonia concentration is likely insufficient to provide high NOx conversion at high NOx feed gas levels (i.e., at high torque demands). Further, intermediate settings may still be insufficient to provide high enough NOx conversion at high NOx feed gas levels. Thus, prior approaches cannot achieve high NOx conversion with minimal ammonia slip, particularly for vehicle engine where NOx concentration levels varies widely and quickly. In other words, because a catalyst experiences widely varying levels of engine NOx, controlling to ammonia slip concentration results in widely varying and less than optimum NOx conversion efficiency.

To overcome drawbacks of prior approaches, the inventors of the present invention disclose a system and method for controlling reductant injection into a catalyst disposed in the exhaust of an internal combustion engine. The method and system determine a reductant fraction representative of the fractional amount of the reductant used in the catalyst (i.e., the amount of reductant used in the reaction in the catalyst) and the amount of the reductant passing through the catalyst. The method and system vary the amount of reductant injection in accordance with both the determined reductant fraction and the amount of reductant passing from the catalyst.

With such method and system, the amount of reductant is used efficiently when the engine is under either a high torque demand or low torque demand condition.

In a preferred embodiment, when the amount of reductant passing from the catalyst (i.e., the post-catalyst reductant concentration) is less than an allowable fraction and level, the amount of reductant is increased. If the increase in reductant leads to no increase in NOx conversion, the reductant is reduced. When the post-catalyst reductant concentration is greater than an allowable fraction, the amount of reductant is decreased. Further, when the post-catalyst reductant concentration is greater than an allowable concentration, the amount of reductant is decreased.

An advantage of the present invention is that because reductant slip is based on two limits, a post-catalyst reductant concentration and the reductant fraction, the values of the limits can be set at less restrictive values. In this way, reductant slip is maintained over the operating conditions of the engine while maintaining high NOx conversion.

Another advantage of the present invention is that in addition to controlling reductant slip based on the two limits, the amount of reductant is increased only when it leads to an improvement in NOx conversion in the catalyst. In this way, reductant slip is allowed to incur the two limits, but only when NOx is being reacted in the catalyst by incurring the limits. The result is a lesser amount of reductant slip without harming NOx conversion.

The above advantages, other advantages, and features of the present invention will be readily apparent from the following detailed description of the preferred embodiments when taken in connection with the accompanying drawings.

BRIEF DESCRIPTION OF DRAWINGS

The advantages described herein will be more fully understood by reading an example of an embodiment in which the invention is used to advantage, referred to herein as the Detailed Description, with reference to the drawings wherein:

FIG. 2 is a flowchart of the method of the present invention.

DETAILED DESCRIPTION

Figure 1:
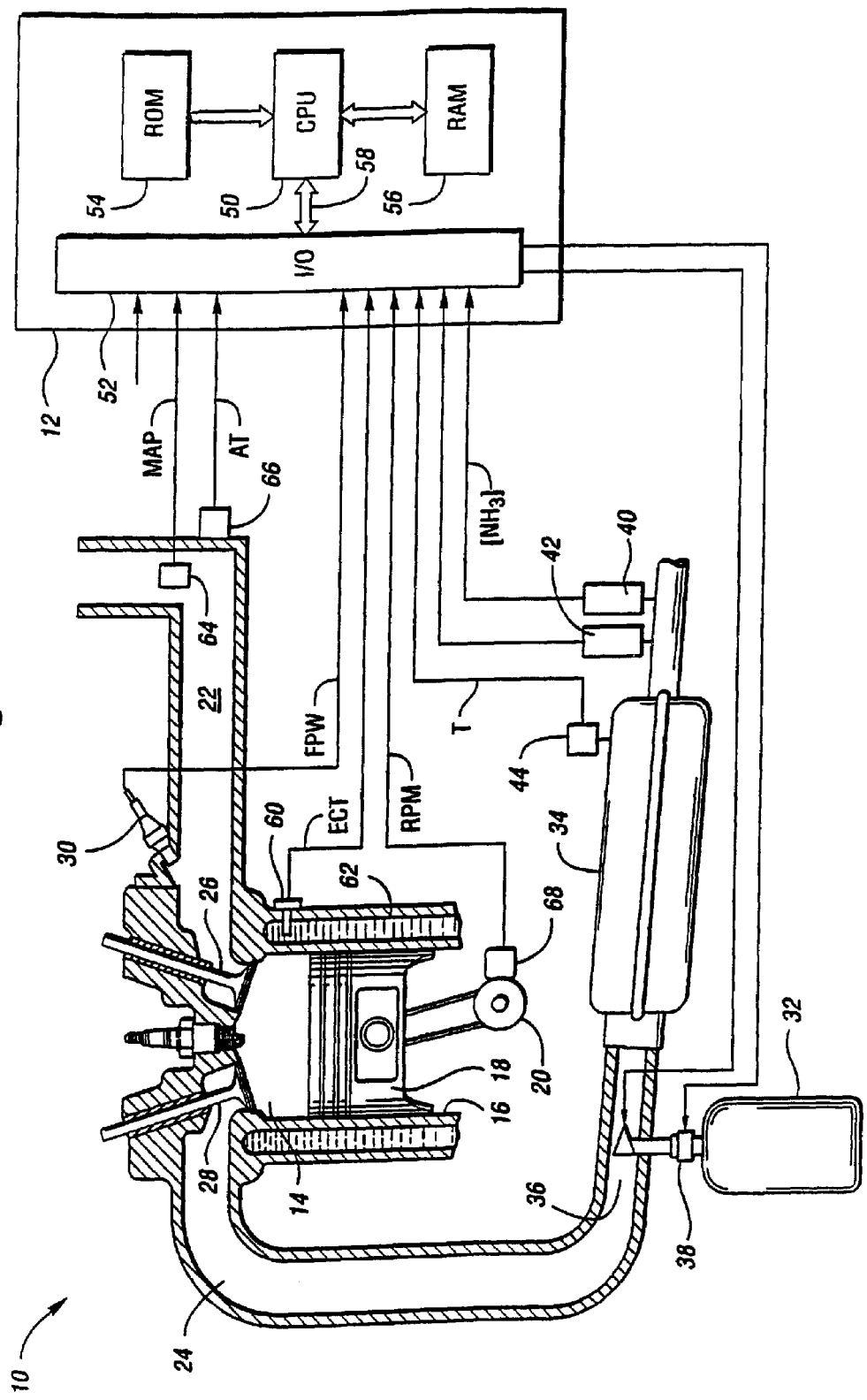
FIG. 1 is a schematic block diagram of the present invention.

Referring to FIG. 1, internal combustion engine 10, here a diesel engine, comprising a plurality of cylinders, one cylinder of which is shown in FIG. 1, is controlled by electronic engine controller 12. Engine 10 includes combustion chamber 14 and cylinder walls 16 with piston 18 positioned therein and connected to crankshaft 20. Combustion chamber 14 is shown communicating with intake manifold 22 and exhaust manifold 24 via respective intake valve 26 and exhaust valve 28. Intake manifold 22 is also shown having fuel injector 30 coupled thereto for delivering liquid fuel in proportion to the pulse width of signal FPW from controller 12. Both fuel quantity, controlled by signal FPW and injection timing are adjustable. Fuel is delivered to fuel injector 30 by a conventional fuel system (not shown) including a fuel tank, fuel pump, and fuel rail (not shown). Alternatively, the engine is configured such that the fuel is injected directly into the cylinder of the engine, which is known to those skilled in the art as a direct injection engine.

Reducing agent, (i.e., a reductant) for example, ammonia, is stored in storage vessel 32 coupled to exhaust manifold 24 upstream of catalyst 34. Catalyst 34 is preferably a selective reductant catalyst (SCR) in which reduction of NOx occurs, even in a lean environment, when a reducing agent is present within catalyst 34. Control valve 36 controls the quantity of reducing agent delivered to the exhaust gases entering catalyst 34. Pump 38 pressurizes the reducing agent supplied to control valve 36. Both pump 38 and control valve 36 are controlled by controller 12.

Ammonia sensor 40 and NOx sensor 42 are shown coupled to exhaust manifold 24 downstream of catalyst 34. Temperature sensor 44 coupled to catalyst 34 provides an indication of the temperature of the catalyst. Ammonia sensor 40 provides an indication of ammonia concentration to controller 12 for determining a control signal sent to control valve 36 as described later herein with particular reference to FIG. 2.

NOx sensor 42 provides an indication of NOx concentration at the catalyst exit. The expected engine out NOx, i.e., NOx upstream of the catalyst, are computed based on experimentally determined relationships between NOx quantity and engine operating conditions known to those skilled in the art to be indicative of engine out NOx quantity such as, for example: engine speed, manifold pressure, intake air temperature, injection timing, injection quantity, and engine coolant temperature. From these two quantities, NOx conversion by catalyst 34 can be determined. NOx conversion is used in controller 12 for determining a control signal sent to control valve 36, as described later herein, with particular reference to FIG. 2.

Controller 12 is shown in FIG. 1 as a conventional microcomputer including: microprocessor unit 50, input/output ports 52, read-only memory 54, random access memory 56, and a conventional data bus 58. Controller 12 is shown receiving various signals from sensors coupled to engine 10, including, for example: engine coolant from temperature sensor 60 coupled to cooling sleeve 62; a measurement of manifold pressure from pressure sensor 64 coupled to intake manifold 22; a measurement of manifold temperature from temperature sensor 66; an engine speed signal from engine speed sensor 68 coupled to crankshaft 20.

Referring now to FIG. 2, a flowchart of the method executed by computer code stored in the controller 12 of the present invention is shown. As will be described, the execution of such code determines a reductant fraction representative of the fractional amount of the reductant passing from the catalyst and the amount of the reductant passing through the catalyst. In accordance therewith, the amount of reductant injection is varied in accordance with both the determined reductant fraction and the amount of reductant passing from the catalyst.

More particularly, the variables discussed are:

[NOx]u=concentration of NOx upstream of catalyst, preferably estimated based on engine operating conditions

[NOx]d=concentration of NOx post-catalyst, preferably determined by a NOx sensor located downstream of the catalyst

[NH3]=ammonia concentration

NC=NOx conversion, ([NOx]u−[NOx]d)/[NOx]u

NCn=next value of NOx conversion

NCp=previous value of NOx conversion

R=[NH3]/[NOx]e molar ratio; the amount of reductant injected is based on the desired molar ratio between the ammonia in the supplied in the reductant and engine out [NOx]

r=value by which R is increased or decreased

Fr=fraction of reductant supplied to the catalyst that is measured after the catalyst, (fraction of reductant not consumed in catalyst)

FrAL=highest allowable Fr

AL=allowable level of post-catalyst ammonia

It is first noted that Fr represents the fractional amount of the reductant used in the catalyst (i.e., the amount of reductant used in the reaction in the catalyst.

The process begins in block 80. In block 82, it is determined whether Fr is less than FrAL and whether the sensed reductant [NH3] is less than AL, the allowable level of ammonia downstream of the catalyst. If both FR and [NH3] are below their respective levels, control passes to block 84 where the amount of reductant is increased, where a new R is equal to the prior R plus r, where r is a predetermined increase. Control passes to block 86 in which it is determined whether increasing R was effective at causing more NOx to be reacted. Specifically, NCn is compared with NCp. If NCn is greater than NCp, i.e., a positive result from step 86, the catalyst efficiency has improved. Control passes back to block 82 where a recheck for compliance with the two thresholds is accomplished. If a negative result is returned from step 86, it signifies that the increase in reductant was unwarranted because no improvement in catalyst efficiency resulted. Thus, control passes to block 90, where the reductant amount is decreased, i.e., the new R is equal to the prior R minus r. Through steps 82, 84, and 86, the reductant can be continually increased while neither of the limits are traversed and ensuring that increases in reductant supply improves conversion efficiency.

In block 82, the two limits are checked. According to Boolean logic for an "and" operation, if either of the inequalities of block 82 returns a negative result, the "and" operation returns a negative result. A positive result is returned when both of the conditions are true, that is, when both Fr and [NH3] are less than their respective limits.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method for controlling reductant injection into a catalyst coupled to an internal combustion engine, the method comprising:

determining a reductant fraction based on an amount of reductant used in the catalyst and an amount of the reductant passing through the catalyst, said fraction representative of a fractional amount of reductant used in a reaction in the catalyst, wherein the fractional amount is based on a desired ratio between ammonia in the supplied reductant and NOx exhausted from the engine;

varying the reductant injection in accordance with both said determined reductant fraction and an amount of reductant exiting the catalyst, and where said varying further includes increasing said reductant injection only when such increase provides increased NOx conversion in the catalyst; and wherein said engine is a diesel engine in a vehicle.

2. The method of claim 1 wherein said varying comprises increasing said amount of reductant injection when said amount of reductant passing from the catalyst is less than an allowable level of post catalyst reductant and said reductant fraction is less than an allowable reductant fraction.

3. The method of claim 2, further composing increasing said amount of reductant injection by a predetermined amount.

4. The method of claim 2, further comprising:
determining a NOx conversion value at a time prior to said increasing step;
determining a NOx conversion value at a time after said increasing step; and
decreasing said amount of reductant injection when said NOx conversion value after said increasing step is greater than said NOx conversion value prior to said reductant increasing.

5. The method of claim 4 wherein said NOx conversion value is based on a value of NOx concentration upstream of the catalyst and a value of NOx concentration downstream of the catalyst.

6. The method of claim 5 wherein said value of NOx concentration upstream of the catalyst is determined based on engine operating conditions.

7. The method of claim 1 wherein said varying comprises decreasing said amount of reductant injection when said reductant concentration passing from the catalyst is greater than an allowable level or said reductant fraction is greater than an allowable reductant fraction.

8. The method recited in claim 7, further comprising decreasing said amount of reductant injection when said reductant concentration downstream of the catalyst is greater than an allowable level of post-catalyst reductant.

9. The method of claim 8, further comprising decreasing said amount of reductant injection when said reductant fraction is greater than an allowable reductant fraction.

10. The method of claim 9 wherein decreasing said amount of reductant injection decreases said amount of reductant injection by a predetermined amount.

11. The method of claim 10, wherein said varying comprises increasing said amount of reductant injection when said amount of reductant passing from the catalyst is less than an allowable level and said reductant fraction is less than an allowable reductant fraction.

12. A method for controlling reductant injection into a catalyst coupled to an internal combustion engine, the method comprising:
determining a reductant fraction based on an amount of reductant used in the catalyst and an amount of the reductant passing through the catalyst, said fraction representative of a fractional amount of reductant used in a reaction in the catalyst, wherein the fractional amount is based on a desired ratio between ammonia in the supplied reductant and NOx exhausted from the engine;

varying the reductant injection in accordance with both said determined reductant fraction and an amount of reductant exiting the catalyst, wherein said varying further comprises decreasing said amount of reductant injection when said reductant concentration passing from the catalyst is greater than an allowable level or said reductant fraction is greater than an allowable reductant fraction, decreasing said amount of reductant injection when said reductant concentration downstream of the catalyst is greater than an allowable level of post-catalyst reductant, and decreasing said amount of reductant injection when said reductant fraction is greater than an allowable reductant fraction; and wherein said engine is a diesel engine in a vehicle.

13. The method of claim 12 wherein said varying comprises increasing said amount of reductant injection when said amount of reductant passing from the catalyst is less than an allowable level of post catalyst reductant and said reductant fraction is less than an allowable reductant fraction.

14. The method of claim 13, further comprising increasing said amount of reductant injection by a predetermined amount.

15. The method of claim 13, further comprising:
determining a NOx conversion value at a time prior to said increasing step;
determining a NOx conversion value at a time after said increasing step; and
decreasing said amount of reductant injection when said NOx conversion value after said increasing step is greater than said NOx conversion value prior to said reductant increasing.

16. The method of claim 15, wherein said NOx conversion value is based on a value of NOx concentration upstream of the catalyst and a value of NOx concentration downstream of the catalyst.

17. The method of claim 16, wherein said value of NOx concentration upstream of the catalyst is determined based on engine operating conditions.

18. A method for controlling reductant injection into a catalyst coupled to an internal combustion engine, the method comprising:
determining a reductant fraction based on an amount of reductant used in the catalyst and an amount of the reductant passing through the catalyst, said fraction representative of a fractional amount of reductant used in a reaction in the catalyst, wherein the fractional amount is based on a desired ratio between ammonia in the supplied reductant and NOx exhausted from the engine;

varying the reductant injection in accordance with both said determined reductant fraction and an amount of reductant exiting the catalyst, wherein said varying comprises increasing said amount of reductant injection when said amount of reductant passing from the catalyst is less than an allowable level of post catalyst reductant and said reductant fraction is less than an allowable reductant fraction, and further comprising increasing said amount of reductant injection by a predetermined amount; and wherein said engine is a diesel engine in a vehicle.

* * * * *